United States Patent [19]

Yamamoto et al.

[11] Patent Number: 5,083,280
[45] Date of Patent: Jan. 21, 1992

[54] METHOD FOR CORRECTING TOOL FEED RATE IN NUMERICAL CONTROL SYSTEM AND APPARATUS THEREFOR

[75] Inventors: Kyoichi Yamamoto; Takao Hasebe, both of Ooguchi, Japan

[73] Assignee: Kabushiki Kaisha Okuma Tekkosho, Aichi, Japan

[21] Appl. No.: 471,958

[22] Filed: Jan. 26, 1990

[30] Foreign Application Priority Data

Jan. 26, 1989 [JP] Japan ................................. 1-17258

[51] Int. Cl.⁵ ..................... G05B 19/18; G05B 13/00
[52] U.S. Cl. ..................... 364/474.3; 364/474.12; 318/571
[58] Field of Search ........... 364/474.3, 474.12, 474.28, 364/474.15, 474.28, 474.3; 318/571

[56] References Cited

U.S. PATENT DOCUMENTS

| | | | |
|---|---|---|---|
| 4,160,937 | 7/1979 | Fiorini | 318/571 |
| 4,330,832 | 5/1982 | Kohzai et al. | 318/571 |
| 4,394,608 | 7/1983 | Tryber et al. | 364/474.3 |
| 4,510,427 | 4/1985 | Nozawa et al. | 364/474.3 |
| 4,646,225 | 2/1987 | Matsuura | 364/474.3 |
| 4,707,793 | 11/1987 | Anderson | 318/571 |

Primary Examiner—Jerry Smith
Assistant Examiner—Patrick D. Muir
Attorney, Agent, or Firm—Wenderoth, Lind & Ponack

[57] ABSTRACT

The tool feed rate correcting method for numerical control system and the apparatus therefor according to this invention correct the feed override values using an override correction coefficient which is calculated from the displacement information of the tool and control the tool feed rate so that machining loads can be maintained within predetermined range irrespective of the machining conditions. This invention is therefore effective in realizing machining with a high efficiency as well as in reducing the cost.

4 Claims, 5 Drawing Sheets

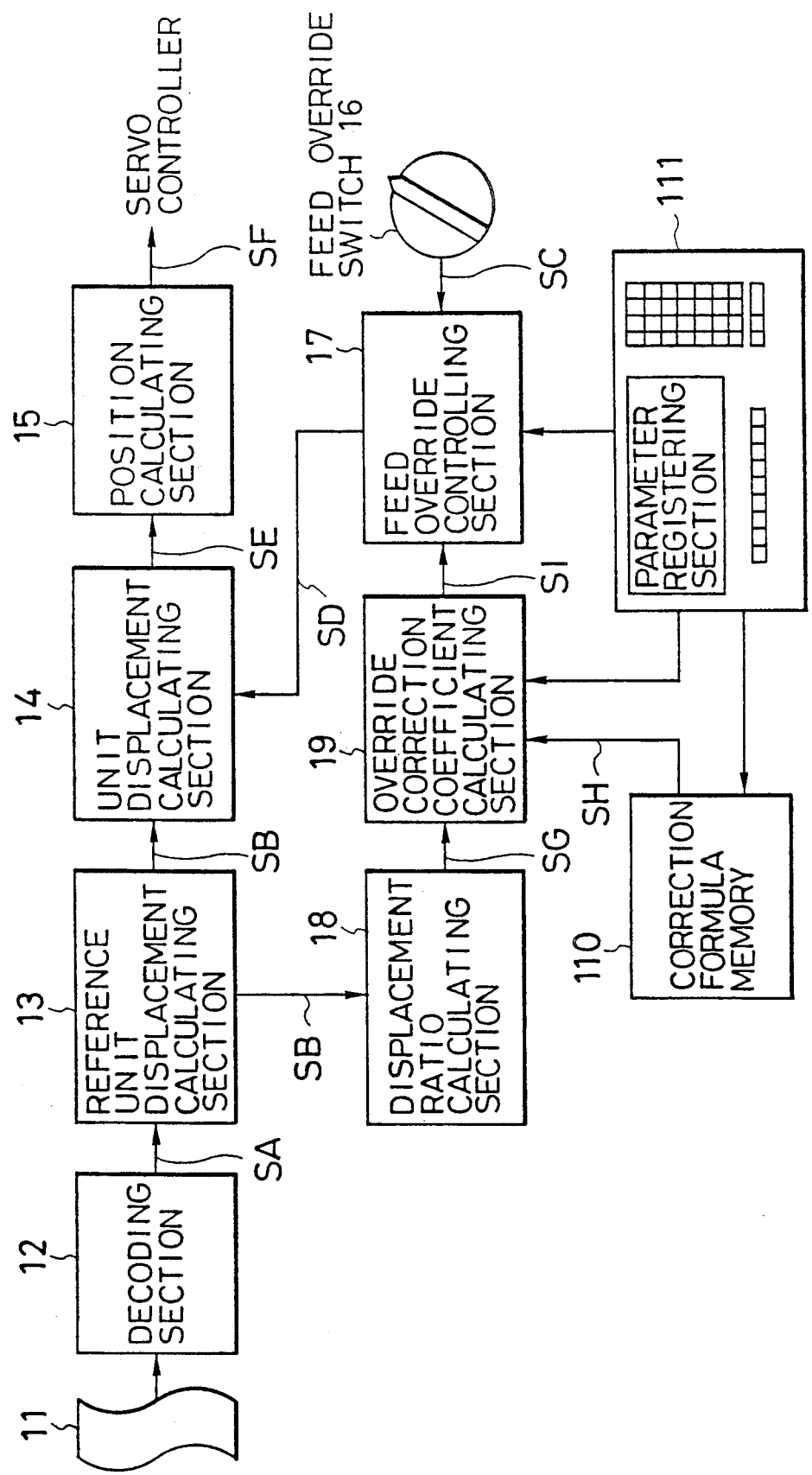
F I G. 5

METHOD FOR CORRECTING TOOL FEED RATE IN NUMERICAL CONTROL SYSTEM AND APPARATUS THEREFOR

BACKGROUND OF THE INVENTION

This invention relates to a method and an apparatus for correcting the tool feed rate in a numerical control system, especially for three dimensional machining.

FIG. 1 is a block diagram to show an apparatus which realizes the conventional tool feed rate correcting method in a numerical control system wherein a machining program 11 is read in a decoding section 12 for interpretation, and a tool feed information SA (e.g. tool feed rate, current tool position, target position, etc.) concerning a tool feed for one block is sent out to a reference unit displacement calculating section 13. Based upon the tool feed information SA for one block, the reference unit displacement calculating section 13 calculates a reference unit displacement SB ($\Delta X_s$, $\Delta Y_s$, $\Delta Z_s$) or the displacement in each direction for one interpolation period when the feed override value is 100%, and sends the same to a unit displacement calculating section 14. Simultaneously, a feed override value SD (Fr) based on the electric signal SC from a feed override switch 16 on an operation panel is input to the unit displacement calculating section 14 via a feed override controlling section 17. The reference unit displacement SB and the feed override value SD are multiplied by the unit displacement calculating section 14 to obtain unit displacement SE ($\Delta X$, $\Delta Y$, $\Delta Z$) which is the displacement in each direction for the current one interpolation period to be sent to a position calculating section 15. The unit displacement SE is added to the tool position (X, Y, Z) at the previous interpolation at the position calculating section 15 to obtain the tool position (X+$\Delta X$, Y+$\Delta Y$, Z+$\Delta Z$) at the current interpolation and sent out to a servo controller.

Operation of the system having the above structure will be described referring to the flow chart shown in FIG. 2. The reference unit displacement calculating section 13 calculates the reference unit displacement ($\Delta X_s$, $\Delta Y_s$, $\Delta Z_s$) according to the tool feed information for one block from the decoding section 12 (Step S21). The unit displacement calculating section 14 calculates the product of the reference unit displacement ($\Delta X_s$, $\Delta Y_s$, $\Delta Z_s$) from the reference unit displacement calculating section 13 and the feed override value Fr from the feed override controlling section 17, or the unit displacement ($\Delta X$, $\Delta Y$, $\Delta Z$)=(Fr×$\Delta X_s$, Fr×$\Delta Y_s$, Fr×$\Delta Z_s$) (Steps S22 and S23). The position calculating section 15 calculates the tool position (X+$\Delta X$, Y+$\Delta Y$, Z+$\Delta Z$) at the current interpolation by adding the unit displacement ($\Delta X$, $\Delta Y$, $\Delta Z$) from the unit displacement calculating section 14 to the tool position (X, Y, Z) at the previous interpolation (Step S24). The servo controller interpolates based on the tool position (X+$\Delta X$, Y+$\Delta Y$, Z+$\Delta Z$) at the current interpolation from the position calculating section 15, and confirms whether or not the tool position at the current interpolation has reached the target position ($X_g$, $Y_g$, $Z_g$) (Step S25). If not, the procedure returns to the above Steps 22 to repeat aforementioned operations. However, when the tool has reached the target position, the procedure returns to the above Step S21 to commence the aforementioned operations for the subsequent block.

In the case where a work is subjected to three dimensional machining by using a ball end mill, the portion of the tool that cuts the work changes depending on the feed direction of the tool. For instance, even if the same tool is used to cut a work at a tool feed rate, a revolutional speed, a pick and a grain depth of the cut, the tool cuts a work at its outer periphery when the tool goes upward on a sloped plane as shown in FIG. 3. Conversely, when it goes down on the slope, the tip end of the tool cuts the work as shown in FIG. 4. This means that the cutting rate and the front rate vary depending on the cutting direction, resulting in a remarkable difference in machining loads. It was heretofore difficult to machine a work while constantly correcting the tool feed speed in a manner that allows the machining loads to remain within a predetermined range. Although it is possible for a part program to determine the tool feed rate depending on the direction of the tool feed, such a method is not practical as the programming becomes extremely complicated. Moreover, even though it is possible to control the tool feed rate while monitoring the machining loads by a monitor device, the monitor device is too expensive to be practically used.

SUMMARY OF THE INVENTION

This invention was contrived to eliminate aforementioned defects encountered in the prior art and aims at providing a method and an apparatus for correcting the tool feed rate in a numerical control system which can easily set the tool feed at a rate that allows the machining loads to remain constantly within a predetermined range.

The nature, principle and utility of the invention will become more apparent from the following detailed description when read in conjunction with the accompanying drawings.

BRIEF DESCRIPTION OF THE DRAWINGS

In the accompanying drawings.

FIG. 5 is a block diagram to show an embodiment of the apparatus which realizes the tool feed rate correcting method for a numerical control system according to this invention.

DESCRIPTION OF THE PREFERRED EMBODIMENT

Figure 1:
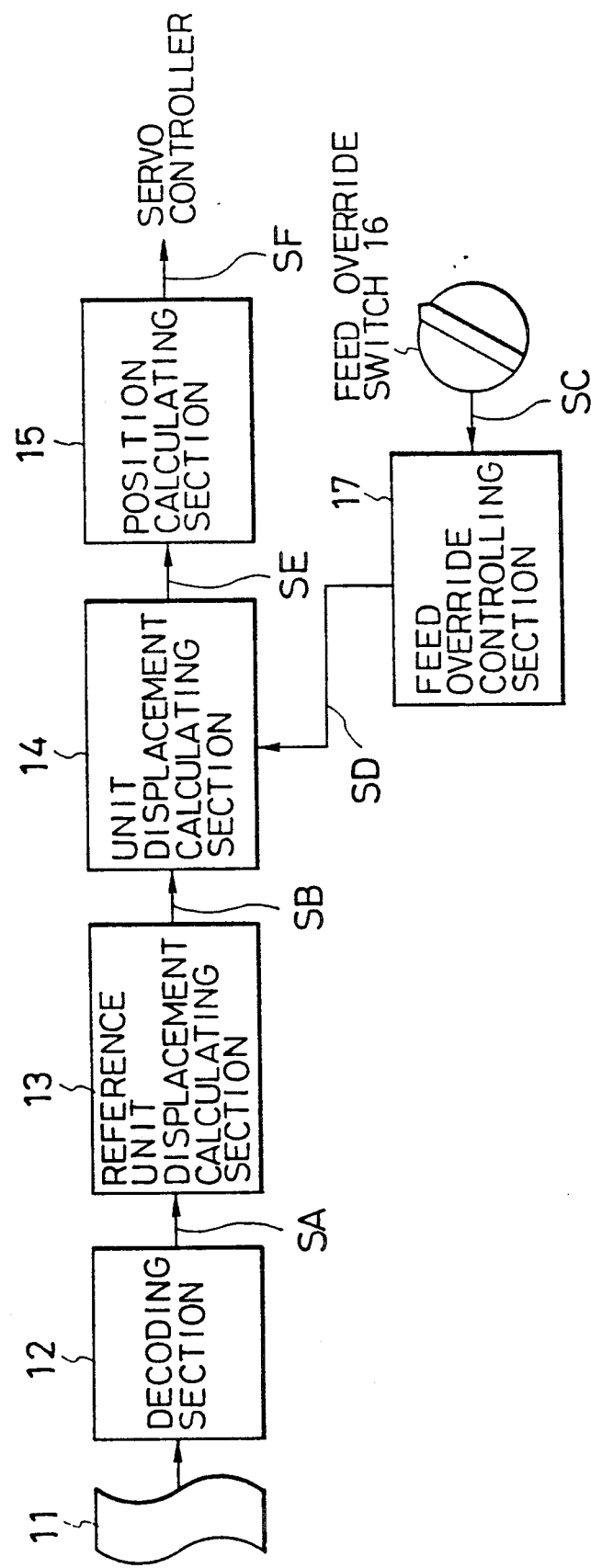
FIG. 1 is a block diagram to show an embodiment of the device which realizes a conventional tool feed rate correction method for numerical control system.
Figure 2:
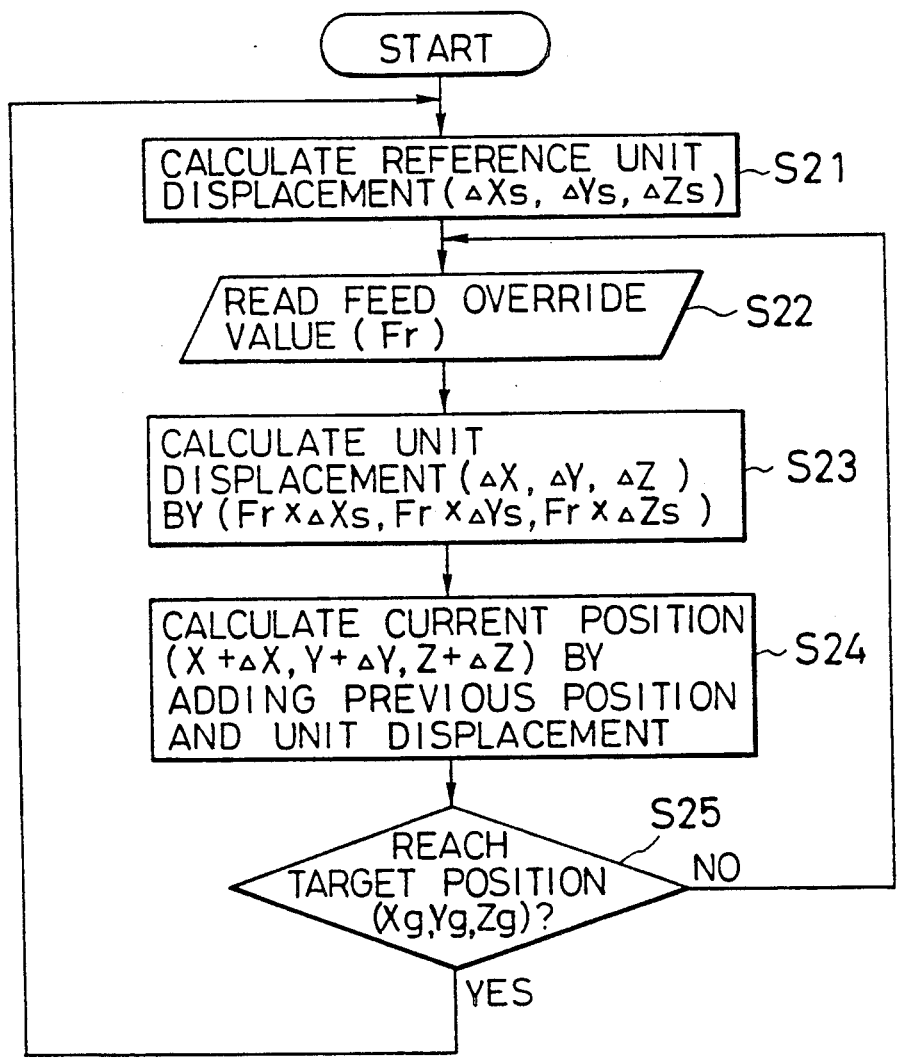
FIG. 2 is a flow chart to show the operation threrof.

FIG. 5 is a block diagram of an apparatus which realizes this invention tool feed rate correcting method for a numerical control system to compare the same with the conventional apparatus shown in FIG. 1, wherein the same component parts are denoted by the same reference numerals for simplification. In this apparatus, a parameter registering section 111 selects parameters to learn whether or not the feed override value should be corrected depending on the displacement direction, and when it should be corrected, a displacement ratio calculating section 18 calculates a ratio ($F_j$) SG of the Z-component in the displacement direction with the reference unit displacement SB ($\Delta X$, $\Delta Y$, $\Delta Z$) from the reference unit displacement calculating section 13, and sends the value to an override correction coefficient calculating section 19. The correction formula memory 110 stores the feed override correction formula SH in advance, and the override correction coefficient calculating section 19 reads out this correction formula SH and substitutes the same by the ratio ($F_J$) SG of the Z-component from the displacement information calculating section 18. Then, the feed override correction coefficient (C) SI is calculated and sent to the feed override controlling section 17.

Figure 6:
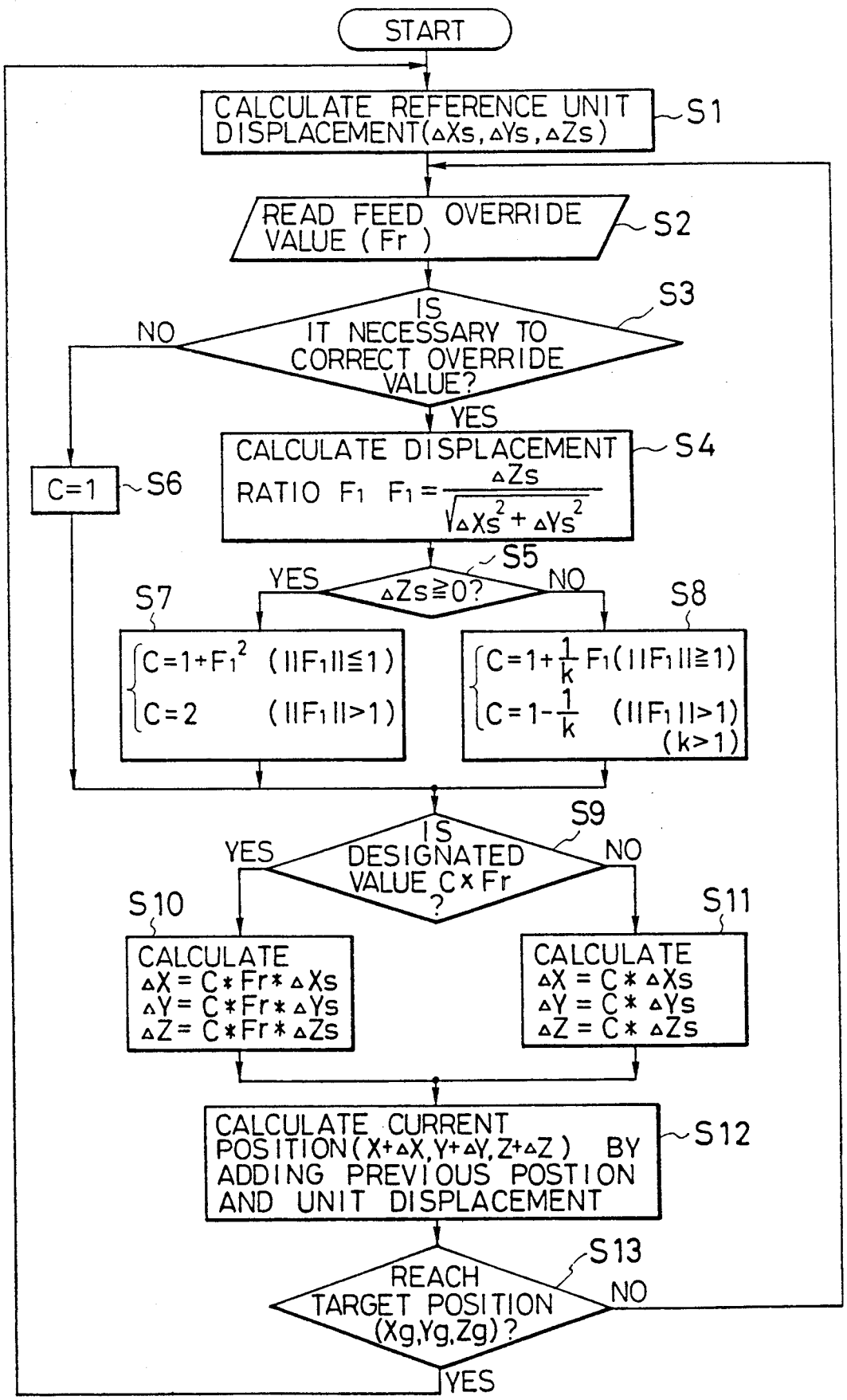
FIG. 6 is a flow chart to explain the operation thereof.

The apparatus with such structure is operated as follows referring to the flow chart shown in FIG. 6. The reference unit displacement calculating section 13 calculates the reference unit displacement ($\Delta X_s$, $\Delta Y_s$, $\Delta Z_s$) according to the tool feed information for one block sent from the decoding section 12 (Step S1). The feed override controlling section 17 reads in the feed override value Fr from the feed override switch 16 (Step S2). The parameter registering section 111 checks whether it is necessary to correct the override value Fr based on the displacement direction or not (Step S3). When the correction is not necessary, the parameter registering section 111 directs the override correction coefficient calculating section 19 that the override correction coefficient C be "1" (Step S6). Then, the operation proceeds to the Step S9. On the other hand, if the correction is necessary, the displacement ratio calculting section 18 calculates the ratio $F_J$ of the Z-component in the displacement direction based on the reference unit displacement ($\Delta X_s$, $\Delta Y_s$, $\Delta Z_s$) from the reference unit displacement calculating section 13 (see the equation (1) below, Step S4).

$$F_I = \frac{\Delta Z_s}{\sqrt{\Delta X_s^2 + \Delta Y_s^2}} \quad (1)$$

The override correction coefficient calculating section 19 confirms whether the relation holds as $\Delta Z_s \geq 0$ (Step S5), and if it does, calculates the override correction coefficient C by the equation (2) below (Step S7). If the relation holds as $\Delta Z_s < 0$, it calculates the correction coefficient C by the formula (3) below (Step S8).

$$\begin{aligned} C &= 1 + F_I^2 \quad (||F_I|| \leq 1) \\ C &= 2 \quad (||F_I|| > 1) \end{aligned} \quad (2)$$

$$\begin{aligned} C &= 1 + \frac{1}{k} F_I \quad (||F_I|| \leq 1, k > 1) \\ C &= 1 - \frac{1}{k} \quad (||F_I|| \leq 1, k > 1) \end{aligned} \quad (3)$$

Figure 3:
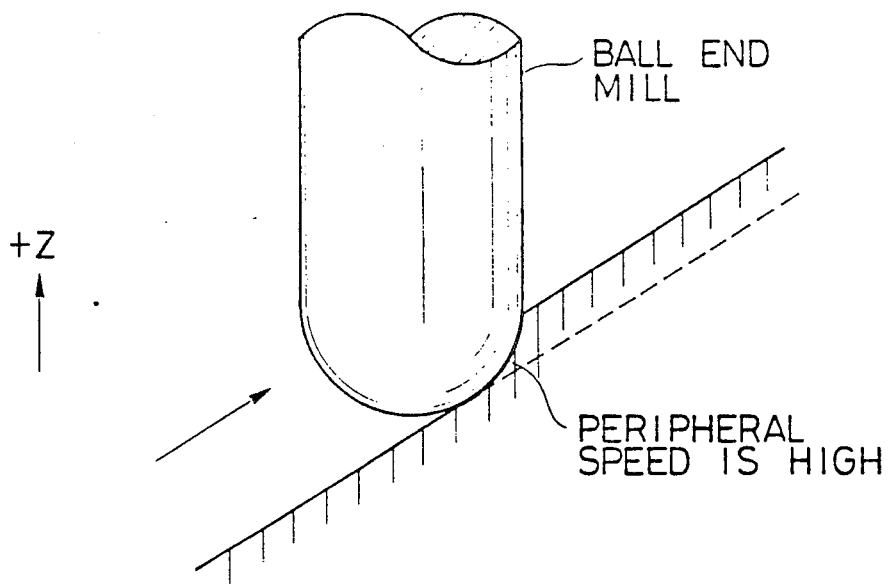
FIGS. 3 and 4 are views respectively to show the states of a ball end mill during the machining.
Figure 4:
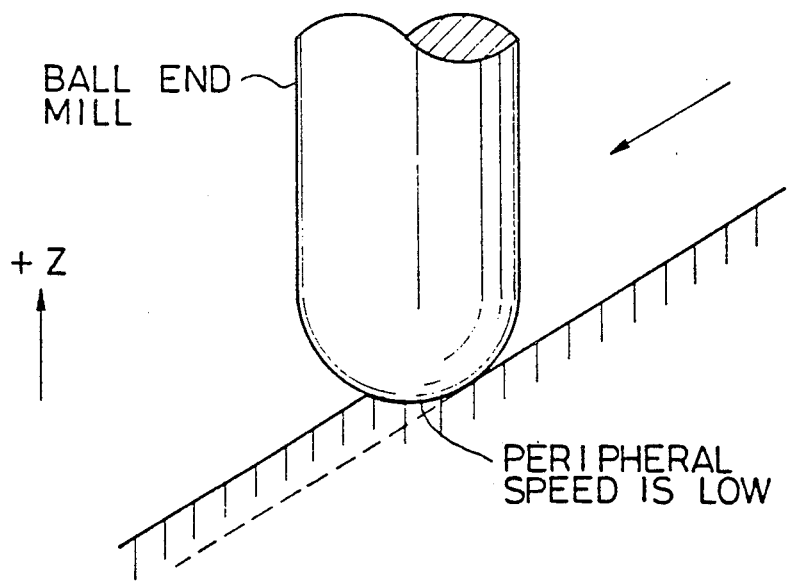

When the relation holds as $\Delta Z_s \geq 0$, the tool goes uphill as shown in FIG. 3, and the cutting rate becomes faster than that on the X—Y plane. Therefore, the correction formula to be read out is the one which makes the tool feed rate faster or the formula (2) which makes the correction coefficient C to be "1" or greater. When the relation holds as $\Delta Z_s < 0$, the tool goes downhill as shown in FIG. 4. The cutting rate at this time becomes slower than the one on the X—Y plane, and therefore the correction formula to be read out is the one which makes the feed rate of the designated tool slower or the formula (3) which makes the correction coefficient C to be smaller than "1".

The feed override controlling section 17 checks whether or not the override value designated by the parameter registering section 111 is the one obtained by multiplying the correction coefficient C with the override value Fr from the feed override switch 16, or the feed override correction coefficient C alone (Step S9). The unit displacement calculating section 14 calculates the unit displacement ($\Delta X$, $\Delta Y$, $\Delta Z$) when the designated value is $C \times Fr$ by the formula (4) (Step S10), and calculates the unit displacement ($\Delta X$, $\Delta Y$, $\Delta Z$) by the formula below (5) when the designated value is C alone (Step S11).

$$\begin{aligned} \Delta X &= C \times Fr \times \Delta X_s \\ \Delta Y &= C \times Fr \times \Delta Y_s \\ \Delta Z &= C \times Fr \times \Delta Z_s \end{aligned} \quad (4)$$

$$\begin{aligned} \Delta X &= C \times \Delta X_s \\ \Delta Y &= C \times \Delta Y_s \\ \Delta Z &= C \times \Delta Z_s \end{aligned} \quad (5)$$

This may differentiate the case where an operator may accidentally touch a feed override switch 16 from the case where the knowhow of the operator may be combined with the automatically determined override by the numerical control, and one may select one of them.

The position calculating section 15 calculates the tool position ($X + \Delta X$, $Y + \Delta Y$, $Z + \Delta Z$) at the current interpolation by adding the tool position (X,Y,Z) at the previous interpolation to the unit displacement ($\Delta X$, $\Delta Y$, $\Delta Z$) from the unit displacement calculating section 14 (Step S12). The servo controller interpolates according to the current interpolation tool position ($X + \Delta X$, $Y + \Delta Y$, $Z + \Delta Z$) from the position calcutating section 15, checks whether or not the tool position ($X + \Delta X$, $Y + \Delta Y$, $Z + \Delta Z$) at the current interpolation has reached the target position ($X_g$, $Y_g$, $Z_g$) (Step S25). When it has not yet reached the target position ($X_g$, $Y_g$, $Z_g$), the procedure returns to the Step S2 to repeat the above mentioned operations, but when it has, the procedure returns to the Step S1 to repeat the steps for the subsequent block.

Although an override switch is used in the above mentioned embodiment, the means is not limited to the override switch but may be any means which can change the feed override value. The formulae for obtaining the feed override correction coefficient are not limited to those mentioned above.

As stated in detail in the foregoing, the tool feed rate correcting method and the apparatus therefore according to the present invention can maintain the machining loads within a predetermined range and thereby easily realize highly efficient machining as well as lower the production cost.

It should be understood that many modifications and adaptations of the invention will become apparent to those skilled in the art and it is intended to encompass such obvious modifications and changes in the scope of the claims appended hereto.

What is claimed is:

1. A tool feed rate correcting method for numerical control system by calculating a unit displacement from a reference unit displacement which in turn is calculated from a tool feed information on the machining program and from a feed override value which has been separately input and by controlling the speed of the tool movement toward the target position in accordance with said calculated unit displacement, the method being characterized in that the ratio of a first displacement component in a first direction based on said reference unit displacement to a second displacement component in a second direction based on said reference unit displacement is calculated, and the ratio thus calculated is substituted in a feed override correction formula which is stored in advance to obtain an override correction coefficient, to thereby correct said feed override value.

2. A tool feed rate correcting method for a numerical control system as claimed in claim 1, wherein said feed override value is corrected by multiplying said override value with said override correction coefficient.

3. A tool feed rate correcting apparatus for a numerical control system which controls the movement of a tool toward a target position by calculating a unit displacement from a reference unit displacement calculated from the tool feed information on the machining program and from the feed override value separately input, the device being characterized by the structure comprising a means to calculate the ratio of a first displacement component in a first direction based on said reference unit displacement to a second displacement component in a second direction based on said reference unit displacement, a means to store feed override correction formula in advance, a means to calculate a feed override correction coefficient by substituting said ratio in said correction formula, and means to correct said feed override value with the coefficient thus calculated.

4. A tool feed correcting apparatus for a numerical control systems as claimed in claim 3, wherein the means to correct said feed override value corrects the value by multiplying said feed override value with said coefficient.

* * * * *